(12) United States Patent
Hastings

(10) Patent No.: US 10,957,360 B1
(45) Date of Patent: Mar. 23, 2021

(54) USING OPTICAL CHARACTER RECOGNITION TO SYNCHRONIZE RECORDED VIDEOS

(71) Applicant: ObjectVideo Labs, LLC, Tysons, VA (US)

(72) Inventor: Robert S. Hastings, Tysons, VA (US)

(73) Assignee: ObjectVideo Labs, LLC, Tysons, VA (US)

( * ) Notice: Subject to any disclaimer, the term of this patent is extended or adjusted under 35 U.S.C. 154(b) by 0 days.

(21) Appl. No.: 16/778,126

(22) Filed: Jan. 31, 2020

Related U.S. Application Data

(60) Provisional application No. 62/800,029, filed on Feb. 1, 2019.

(51) Int. Cl.
| | | |
|---|---|---|
| *G11B 27/30* | (2006.01) | |
| *G06K 9/20* | (2006.01) | |
| *G06K 9/32* | (2006.01) | |
| *G06K 9/62* | (2006.01) | |
| *G06K 9/00* | (2006.01) | |

(52) U.S. Cl.
CPC ...... *G11B 27/3081* (2013.01); *G06K 9/00744* (2013.01); *G06K 2209/01* (2013.01)

(58) Field of Classification Search
CPC .......... G11B 27/3081; G11B 20/10527; G11B 27/30; G06K 9/00744; G06K 2209/01; G06K 9/32; G06K 9/62; G06K 9/20

USPC ........................................ 386/244; 369/47.16
See application file for complete search history.

(56) References Cited

U.S. PATENT DOCUMENTS

| | | | |
|---|---|---|---|
| 10,460,178 B1 | 10/2019 | Fieldman | |
| 2007/0189333 A1 | 8/2007 | Naaman et al. | |
| 2010/0318913 A1* | 12/2010 | Cupala | G06F 3/0481 715/719 |
| 2015/0310891 A1* | 10/2015 | Pello | G11B 20/10527 369/47.16 |
| 2018/0192091 A1* | 7/2018 | Berglund | G11B 27/10 |

* cited by examiner

*Primary Examiner* — Thai Q Tran
*Assistant Examiner* — Jose M Mesa
(74) *Attorney, Agent, or Firm* — Fish & Richardson P.C.

(57) ABSTRACT

Methods, systems, and apparatus, including computer programs encoded on a computer storage medium, for synchronizing recorded videos. The methods, systems, and apparatus include actions of receiving a first video and a second video, determining first time stamps from pixels in the first video, determining second time stamps from pixels in the second video, determining an earliest frame in each of the videos that time stamps match, pairing the earliest frames, determining that a subsequent frame in each of the videos have corresponding time stamps that have a difference that satisfies a criteria, and pairing the subsequent frame in the first video with a frame after the subsequent frame in the second video.

20 Claims, 2 Drawing Sheets

USING OPTICAL CHARACTER RECOGNITION TO SYNCHRONIZE RECORDED VIDEOS

CROSS-REFERENCE TO RELATED APPLICATION

This application claims the benefit of U.S. Provisional Application No. 62/800,029, filed Feb. 1, 2019, and titled "Using Optical Character Recognition to Synchronize Recorded Videos," which is incorporated by reference.

STATEMENT REGARDING FEDERALLY SPONSORED RESEARCH OR DEVELOPMENT

This invention was made with government support under N00014-17-C-7030 awarded by the Office of Naval Research. The government has certain rights in the invention.

TECHNICAL FIELD

This disclosure application relates generally to monitoring systems.

SUMMARY

Techniques are described for synchronizing recorded videos. Video analytics may process video from multiple camera feeds simultaneously. When setting up or testing a deployment, many hours of test video may be recorded from each of these camera feeds and these test videos may be used for generating ground truth, running regression tests, identifying bugs, and correcting bugs, etc.

It may be helpful for video files to be recorded beginning at the same instant and running at identical frame rates. In such a scenario, a system may take the nth frame from each video file, in succession, to have frames from each video file that correspond to the same time. However, external factors, such as interruptions in network traffic and the load on recording devices, may influence actual recording results.

For example, an hour of video may be recorded from two cameras and the resulting video files may be recorded at 25.02 frames per second (fps), and 25.03 fps, respectively. When processing the recorded files frame-by-frame, the lag between frames may grow to nearly 1.5 seconds (36 frames) over the course of the hour. While analytics may perform well with live video, the lag for recorded video may result in errors when testing against the recordings. Further, if the video files do not begin recording at the same time, this may result in another source of lag that may need to be accounted for.

A system may synchronize recorded videos using optical character recognition on time stamps included in the videos. Each of the cameras may have an internal clock driven by the same source as the other cameras, e.g., the same (Network Time Protocol) NTP server, and provide video that includes a visual time stamp based on its internal clock.

The system may perform optical character recognition of frames of videos to recognize time stamps shown in the videos and determine when the frames were recorded based on the time stamps. The system may then find the earliest time where frames are available from both of the videos, process those frames together, and then continue processing subsequent frames from each of the videos together. The system may determine when frames from the videos start to differ too much in the times that they were recorded and skip frames in the videos as appropriate.

Synchronizing recorded video may allow for extension of the life of test data needed for developing multi-source analytics and may further help to compare live analytics results to regression test results or ground truth (derived from recorded video), where simply processing video frame-by-frame may render out-of-sync videos unusable.

Implementations of the described techniques may include hardware, a method or process implemented at least partially in hardware, or a computer-readable storage medium encoded with executable instructions that, when executed by a processor, perform operations.

The details of one or more implementations are set forth in the accompanying drawings and the description below. Other features will be apparent from the description and drawings, and from the claims.

DESCRIPTION OF DRAWINGS

Like reference numbers and designations in the various drawings indicate like elements

DETAILED DESCRIPTION

Figure 1:
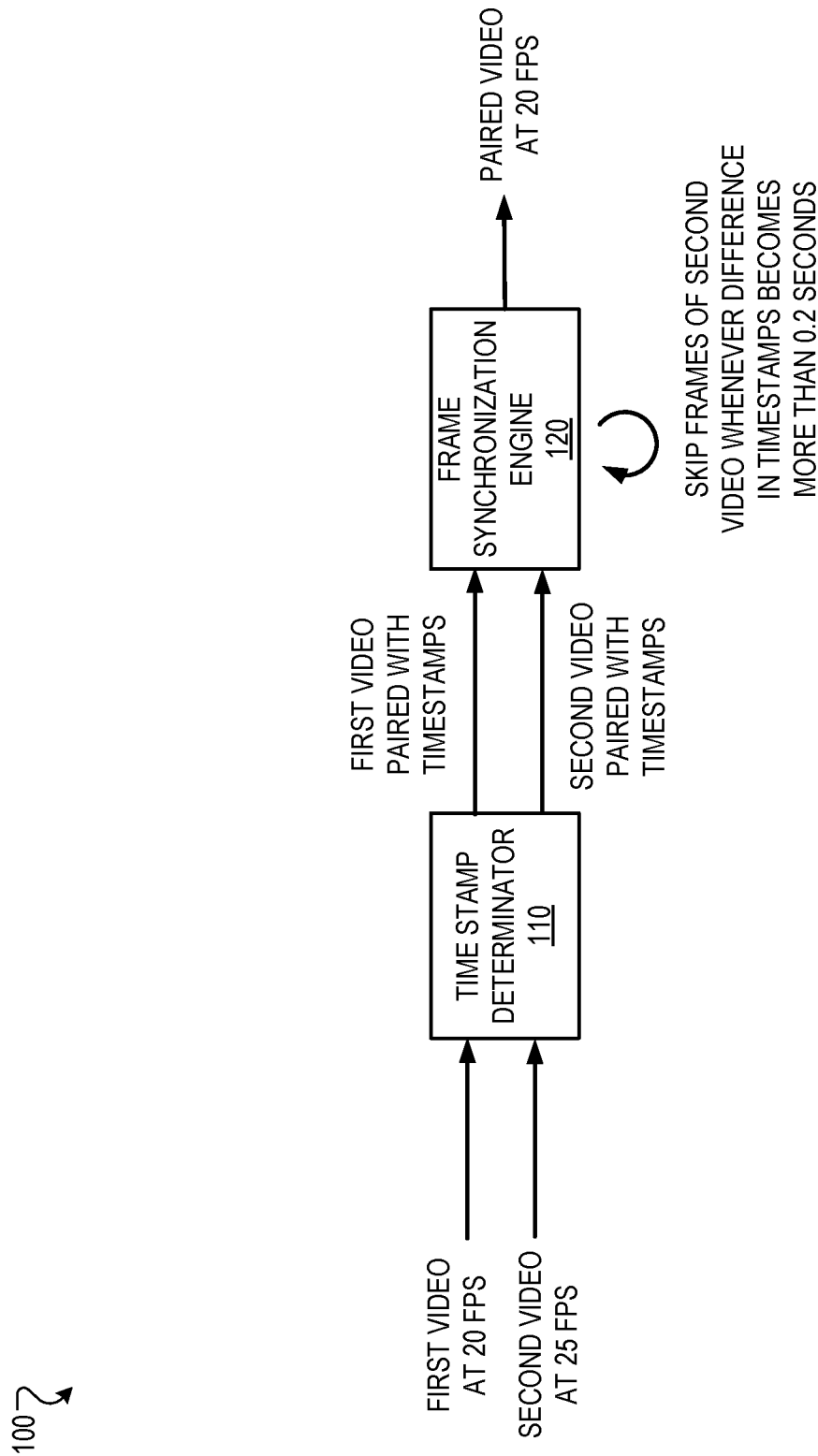
FIG. 1 illustrates a block diagram of an example system for synchronizing recorded videos.

FIG. 1 illustrates an example block diagram of a system 100 for synchronizing recorded videos. The system 100 includes a time stamp determinator 110 and a frame synchronization engine 120. The time stamp determinator 110 may determine time stamps from videos. For example, the time stamp determinator 110 may determine that a first video starts with a frame with a time stamp of "12:00:00.0" and a second video starts with a frame with a time stamp of "11:59:59.2."

The time stamp determinator 110 may determine time stamps for frames of video by performing optical character recognition. For example, the time stamp determinator 110 may analyze pixels within a frame to recognize numbers and characters. In some implementations, the time stamp determinator 110 may determine time stamps by identifying text that appears to conform to a time stamp. For example, the time stamp determinator 110 may determine that text matches a format for a time stamp based on the text including two numerical characters followed by a colon, followed by two numerical characters and another colon, and followed by two more numerical characters, a dot, and a final numerical character, and, in response, determine that the text corresponds to a time stamp.

In some implementations, the time stamp determinator 110 may determine time stamps in subsequent frames based on a location that time stamps were previously determined from the video. For example, the time stamp determinator 110 may determine that a time stamp was recognized in a first frame of a video in a lower left corner and, in response, only perform optical character recognition on the lower left corner in subsequent frames of the video to determine time stamps from the subsequent frames. Limiting the area that the time stamp determinator 110 performs optical character recognition may reduce the amount of processing needed by the time stamp determinator 110 as less pixels of the frames may need to be analyzed and may reduce the likelihood that the time stamp determinator 110 determines a time stamp from text that is not actually from a time stamp shown in the frame, e.g., other text that may coincidentally conform with a format of time stamps.

In some implementations, the time stamp determinator 110 may determine time stamps for a first few consecutive frames of each video to determine an fps that the video is recorded from the time stamps. For example, the time stamp determinator 110 may determine time stamps of "12:00:00.00," "12:00:00.04," and "12:00:00.08" from optical character recognition on the first three consecutive frames in a first video, from the time stamps determine that the time difference between each time stamp is 0.04 seconds, and determine from the time difference that the fps of the first video is 25 fps. Additionally or alternatively, the time stamp determinator 110 may determine an fps that video is recorded from metadata in the video. For example, a video file may store a field that includes a value that includes an fps that the video file was recorded.

In some implementations, after determining the fps, the time stamp determinator 110 may determine time stamps for frames by calculating a time based on the fps, the last time stamp determined from optical character recognition, and the number of frames since the last time stamp was determined from optical character recognition. For example, the time stamp determinator 110 may determine a time stamp of "12:00:01.00" from optical character recognition from a third frame in a video and an fps of a video is 25 fps, and then determine "12:00:01.08" for the fifth frame as it is two frames after the time stamp of "12:00:01.0" of the third frame and two frames at 25 fps would be an additional 0.8 second later.

In some implementations, the time stamp determinator 110 may determine time stamps using optical character recognition periodically. For example, the time stamp determinator 110 may use optical character recognition every thirty seconds, every minute, every five minutes, or some other periodic amount of time, to determine time stamps. Accordingly, time stamp determinator 110 may ensure that the time stamps calculated based on the fps determined for the video is still accurate. The time stamp determinator 110 may prioritize using the time stamps from optical character recognition over time stamps calculated from fps calculation. For example, if a time stamp extracted from a time stamp is "12:10:01.05" and the time stamp calculated using fps is "12:10:01.00," the time stamp determinator 110 may use the time stamp of "12:10:01.05" for that frame.

The frame synchronization engine 120 may pair frames of videos together. For example, the frame synchronization engine 120 may pair a first frame from a first video and a first frame from a second video, a second frame from the first video and a second frame from the second video, skip the third frame of the second video, and pair the third frame from the first video with the fourth frame of the second video.

The frame synchronization engine 120 may pair frames of video together by initially determining the earliest time that the two videos have time stamps that match. For example, the two videos may start recording at different times so a first frame of the first video may have a time stamp of "12:00:00.0" and the thirtieth frame of the second video may have a time stamp of "12:00:00.0," and the frame synchronization engine 120 may determine that the earliest time that the two videos have time stamps that match is "12:00:00.0" and pair the first frame of the first video and the thirtieth frame of the second video.

The frame synchronization engine 120 may pair subsequent frames of the videos with each other until the frame synchronization engine 120 determines that the time stamps of the frames of the videos do not match. For example, the frame synchronization engine 120 may initially pair the first frame of a first video and a thirtieth frame of the second video, pair the second frame of the first video, and a thirty first frame of the second video, pair the third frame of the first video, and a thirty second frame of the second video, and then determine that the fourth frame of the first video and the thirty third frame of the second video have time stamps that don't match.

The frame synchronization engine 120 may determine that time stamps no longer match based on determining that a time difference between the time stamps satisfies a criteria. For example, the frame synchronization engine 120 may determine that the next unpaired frame of a first video is "12:00:00.15" and the next unpaired frame of a second video is "12:00:00.12" so the times differ by 0.03 seconds and, in response, determine that 0.03 seconds satisfies a criteria of a difference being more than 0.02 seconds. In some implementations, the frame synchronization engine 120 may determine the criteria based on determining a maximum drift. The maximum drift may be half the lesser of a period between frames of the first video and frames of the second video. For example, the maximum drift may be 0.02 seconds as that is half of the lesser between 0.05 seconds between a first video at 20 fps and 0.04 seconds between a second video at 25 fps.

In the event that the frame synchronization engine 120 determines that time stamps between frames of videos do not match, the frame synchronization engine 120 may skip pairing a frame that has the earlier time. For example, in response to the frame synchronization engine 120 determining that the next unpaired frame of a first video is "12:00:00.15" and the next unpaired frame of a second video is "12:00:00.12," the frame synchronization engine 120 may skip the unpaired frame of the second video and instead pair the unpaired frame of the first video with the time stamp of "12:00:00.15" with the next unpaired frame of the second video with the time stamp of "12:00:00.16." In some implementations, the frame synchronization engine 120 may skip multiple frames until frames between each of the videos are determined to match.

While FIG. 1 is described in relation to synchronizing two videos, the system 100 may similarly be used to synchronize three or more videos. For example, the time stamp determinator 110 may determine time stamps for three videos and the frame synchronization engine 120 may determine the earliest time that a frame from each of the three videos are within a maximum drift based on the fps of the three videos.

Figure 2:
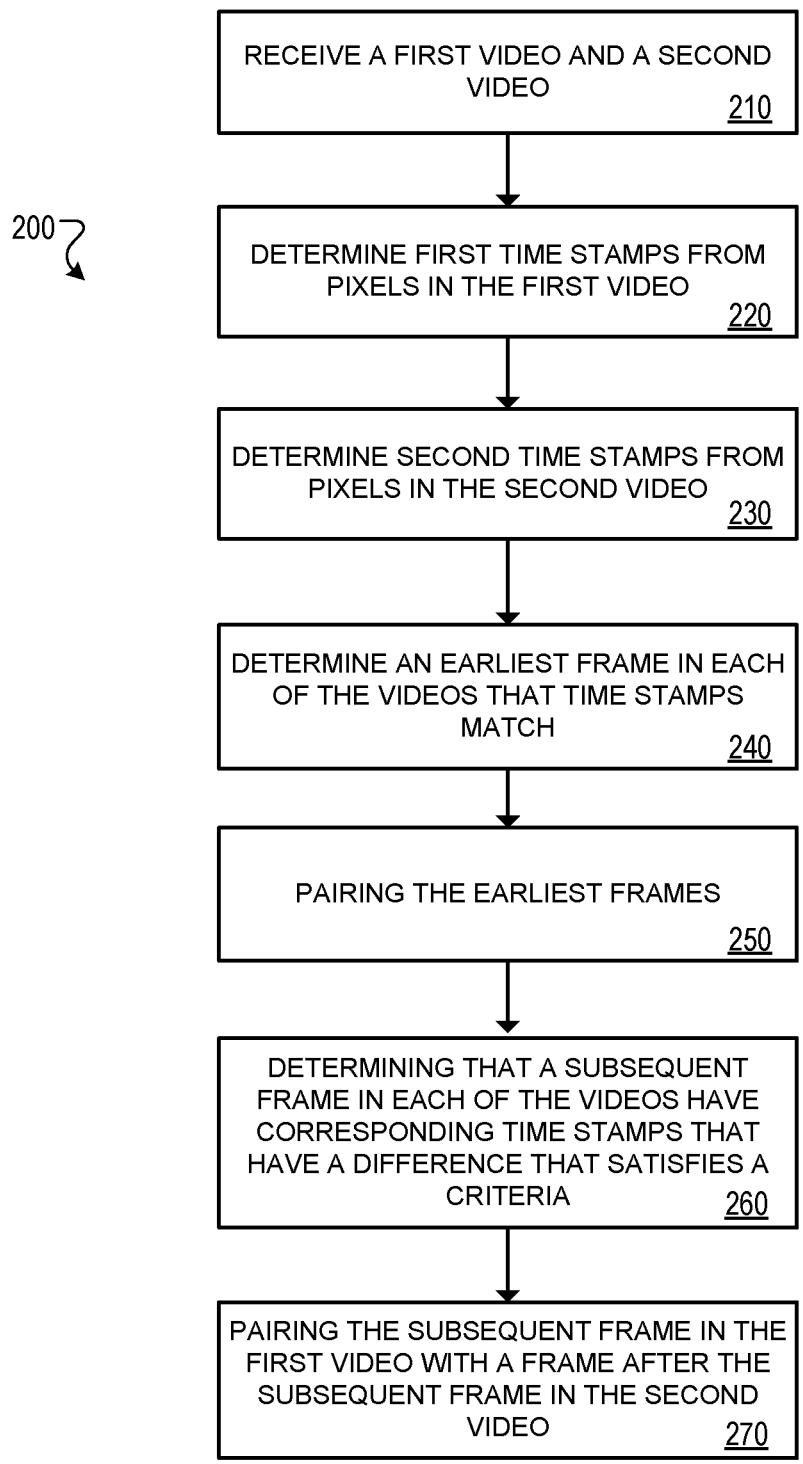
FIG. 2 is a flow diagram of an example process for synchronizing recorded videos.

FIG. 2 is a flow diagram of an example process 200 for synchronizing recorded videos. The process 200 includes receiving a first video and a second video (210). For example, the time stamp determinator 110 may obtain a first video that was recorded at 20 fps and a second video that was recorded at 25 fps.

The process 200 includes determining first time stamps from pixels in the first video (220). For example, the time stamp determinator 110 may determine time stamps for pixels in each of a first few consecutive frames in the first video, determine an fps that the first video was recorded based on the time stamps, and then determine additional time stamps for later frames based on the last time stamp determined based on pixels and the fps.

The process 200 includes determining second time stamps from pixels in the second video (230). For example, the time stamp determinator 110 may determine time stamps for pixels in each of a first few consecutive frames in the second video, determine an fps that the second video was recorded based on the time stamps, and then determine additional time stamps for later frames based on the last time stamp determined based on pixels and the fps.

The process 200 includes determining an earliest frame in each of the videos that time stamps match (240). For example, the frame synchronization engine 120 may determine that "12:00:00.0" is the earliest time that there are time stamps for frames from each video that match. In some implementations, determining an earliest frame in each of the videos that time stamps match includes determining an earliest time stamp in the first time stamps where a difference between the earliest time stamp and a time stamp in the second time stamps satisfies a match criteria and determining a frame in the first video that shows the earliest time stamp as the earliest frame in the first video that matches. For example, the frame synchronization engine 120 may determine that the earliest time stamp in the first video is earlier than the earliest time stamp in the second video, and then from the earliest time stamp in the second video, determine the earliest time stamp in the first video where a time stamp in the second video is within 0.2, 0.3, or some other predetermined amount of seconds.

The process includes pairing the earliest frames (250). For example, the frame synchronization engine 120 may pair the frame from the first video with the time stamp of "12:00:00.0" and the frame from the second video with the time stamp of "12:00:00.0."

The process 200 includes determining that a subsequent frame in each of the videos have corresponding time stamps that have a difference that satisfies a criteria (260). For example, the frame synchronization engine 120 may determine that the next unpaired frame for each video have time stamps that differ in time by more than a maximum drift of 0.2 seconds. In another example, the frame synchronization engine 120 may determine that the next unpaired frame for each video have time stamps that differ in time by 0.1 seconds which does not satisfy a criteria of a greater than or equal to a 0.2 seconds.

In some implementations, determining that a subsequent frame in each of the videos have corresponding time stamps that have a difference that satisfies a criteria includes determining that the subsequent frame in the first video has a timestamp that differs from a timestamp of the subsequent frame in the second video by more than a predetermined amount of time. For example, the frame synchronization engine 120 may determine that the subsequent frame in the first video has a timestamp of 12:00:00.2 and the subsequent frame in the first video has a timestamp of 12:00:00.6 and the difference of 0.4 seconds is more than a predetermined amount of 0.3 seconds.

In some implementations, determining that a subsequent frame in each of the videos have corresponding time stamps that have a difference that satisfies a criteria includes determining a third time stamp for the subsequent frame in the first video based on a frames per second calculated for the first video, determining a fourth time stamp for the subsequent frame in the second video based on a frames per second calculated for the second video, and determining that a difference in time between the third time stamp and the fourth time stamp satisfies the criteria.

For example, the frame synchronization engine 120 may determine that, where the prior immediate frames in both videos had a time stamp of "12:00:00," the subsequent frame in the first video has a timestamp of 12:00:00.1 based on a fps of ten frames per second for the first video and the subsequent frame in the first video has a timestamp of 12:00:00.2 based on a fps of five frames per seconds for the second video, and the difference of 0.1 seconds is more than a predetermined amount of 0.05 seconds.

In some implementations, determining first time stamps from pixels in the first video includes for an initial subset of frames in the first video, determining an initial subset of the time stamps from the pixels in the initial subset of frames in the first video, determining a frames per second that that the first video was recorded based on the initial subset of the time stamps, and for a subsequent subset of frames in the first video, determining a subsequent subset of the time stamps from the frames per second that was determined.

For example, the frame synchronization engine 120 may, for the ten first frames in the first video, determine a time stamp for each of the frames based on OCR of pixels in the respective frame, determining a fps for the first video from a difference between the time stamps for the frames, and then determine time stamps for frames after the first ten frames based on the fps.

In some implementations, for a subsequent subset of frames in the first video, determining a subsequent subset of the time stamps from the frames per second that was determined includes determining the subsequent subset of the time stamps from both the frames per second that was determined and a latest time stamp in the initial subset of the time stamps determined from the pixels. For example, the frame synchronization engine 120 may determine the subsequent subset of the time stamps from the time stamp of the tenth, last frame in an initial subset of ten frames and the fps determined from the time stamps of the initial subset of ten frames.

The process 200 includes pairing the subsequent frame in the first video with a frame after the subsequent frame in the second video (270). For example, the frame synchronization engine 120 may skip the frame with the earlier time stamp in a video and pair a frame after in the video with the next unpaired frame from the second video.

In some implementations, pairing the subsequent frame in the first video with a frame after the subsequent frame in the second video includes storing an indication that the subsequent frame in the first video was captured when the frame after the subsequent frame in the second video was captured. For example, the frame synchronization engine 120 may one or more of store the subsequent frame in the first video with a label that identifies the subsequent frame in the second video or store the frame after the subsequent frame in the second video with a label that identifies the subsequent frame in the first video.

In some implementations, pairing the subsequent frame in the first video with a frame after the subsequent frame in the second video includes not pairing the subsequent frame in the second video with any frame in the first video. For example, the frame synchronization engine 120 may store the subsequent frame in the first video without a label that identifies a frame in the second video while storing the subsequent frame in the second video without a label that identifies a frame in the first video.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed application-specific integrated circuits (ASICs).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A computer-implemented method comprising:
receiving a first video and a second video, wherein the first video is recorded at a frames per second that is less than a frames per second that the second video is recorded;
determining first time stamps from optical character recognition on pixels in the first video;
determining second time stamps from optical character recognition on pixels in the second video;
determining an earliest frame in each of the videos that time stamps shown in the videos match;
pairing the earliest frames;
determining that a difference between a timestamp in a subsequent frame after the earliest frame in the first video and a time stamp in a subsequent frame after the earliest frame in the second video satisfies a criteria; and
pairing the subsequent frame in the first video with a frame after the subsequent frame in the second video.

2. The method of claim 1, wherein determining that a difference between a timestamp in a subsequent frame after the earliest frame in the first video and a time stamp in a subsequent frame after the earliest frame in the second video that have a difference that satisfies a criteria comprises:
determining that the subsequent frame 12071207 in the first video has a timestamp that differs from a timestamp of the subsequent frame in the second video by more than a predetermined amount of time.

3. The method of claim 1, wherein determining that a difference between a timestamp in a subsequent frame after the earliest frame in the first video and a time stamp in a subsequent frame after the earliest frame in the second video satisfies a criteria comprises:
determining a third time stamp for the subsequent frame in the first video based on a frames per second calculated for the first video;
determining a fourth time stamp for the subsequent frame in the second video based on a frames per second calculated for the second video; and
determining that a difference in time between the third time stamp and the fourth time stamp satisfies the criteria.

4. The method of claim 1, wherein determining first time stamps from optical character recognition on pixels in the first video comprises:
for an initial subset of frames in the first video, determining an initial subset of the time stamps from optical character recognition on the pixels in the initial subset of frames in the first video;
determining a frames per second that that the first video was recorded based on the initial subset of the time stamps; and
for a subsequent subset of frames in the first video, determining a subsequent subset of the time stamps from the frames per second that was determined.

5. The method of claim 4, wherein for a subsequent subset of frames in the first video, determining a subsequent subset of the time stamps from the frames per second that was determined comprises:
determining the subsequent subset of the time stamps from both the frames per second that was determined and a latest time stamp in the initial subset of the time stamps determined from the pixels.

6. The method of claim 1, wherein pairing the subsequent frame in the first video with a frame after the subsequent frame in the second video comprises:
storing an indication that the subsequent frame in the first video was captured when the frame after the subsequent frame in the second video was captured.

7. The method of claim 1, wherein pairing the subsequent frame in the first video with a frame after the subsequent frame in the second video comprises:
not pairing the subsequent frame in the second video with any frame in the first video.

8. The method of claim 1, wherein determining an earliest frame in each of the videos that time stamps match comprises:
determining an earliest time stamp in the first time stamps where a difference between the earliest time stamp and a time stamp in the second time stamps satisfies a match criteria; and
determining a frame in the first video that shows the earliest time stamp as the earliest frame in the first video that matches.

9. A system comprising:
one or more computers and one or more storage devices storing instructions that are operable, when executed by the one or more computers, to cause the one or more computers to perform operations comprising:
receiving a first video and a second video, wherein the first video is recorded at a frames per second that is less than a frames per second that the second video is recorded;
determining first time stamps from optical character recognition on pixels in the first video;
determining second time stamps from optical character recognition on pixels in the second video;

determining an earliest frame in each of the videos that time stamps shown in the videos match;

pairing the earliest frames;

determining that a difference between a timestamp in a subsequent frame after the earliest frame in the first video and a time stamp in a subsequent frame after the earliest frame in the second video satisfies a criteria; and pairing the subsequent frame in the first video with a frame after the subsequent frame in the second video.

10. The system of claim 9, wherein determining that a difference between a timestamp in a subsequent frame after the earliest frame in the first video and a time stamp in a subsequent frame after the earliest frame in the second video satisfies a criteria comprises:

determining that the subsequent frame in the first video has a timestamp that differs from a timestamp of the subsequent frame in the second video by more than a predetermined amount of time.

11. The system of claim 9, wherein determining that a difference between a timestamp in a subsequent frame after the earliest frame in the first video and a time stamp in a subsequent frame after the earliest frame in the second video satisfies a criteria comprises:

determining a third time stamp for the subsequent frame in the first video based on a frames per second calculated for the first video;

determining a fourth time stamp for the subsequent frame in the second video based on a frames per second calculated for the second video; and determining that a difference in time between the third time stamp and the fourth time stamp satisfies the criteria.

12. The system of claim 9, wherein determining first time stamps from optical character recognition on pixels in the first video comprises:

for an initial subset of frames in the first video, determining an initial subset of the time stamps from optical character recognition on the pixels in the initial subset of frames in the first video;

determining a frames per second that that the first video was recorded based on the initial subset of the time stamps; and for a subsequent subset of frames in the first video, determining a subsequent subset of the time stamps from the frames per second that was determined.

13. The system of claim 12, wherein for a subsequent subset of frames in the first video, determining a subsequent subset of the time stamps from the frames per second that was determined comprises:

determining the subsequent subset of the time stamps from both the frames per second that was determined and a latest time stamp in the initial subset of the time stamps determined from the pixels.

14. The system of claim 9, wherein pairing the subsequent frame in the first video with a frame after the subsequent frame in the second video comprises:

storing an indication that the subsequent frame in the first video was captured when the frame after the subsequent frame in the second video was captured.

15. The system of claim 9, wherein pairing the subsequent frame in the first video with a frame after the subsequent frame in the second video comprises:

not pairing the subsequent frame in the second video with any frame in the first video.

16. The system of claim 9, wherein determining an earliest frame in each of the videos that time stamps match comprises:

determining an earliest time stamp in the first time stamps where a difference between the earliest time stamp and a time stamp in the second time stamps satisfies a match criteria; and determining a frame in the first video that shows the earliest time stamp as the earliest frame in the first video that matches.

17. A non-transitory computer-readable medium storing software comprising instructions executable by one or more computers which, upon such execution, cause the one or more computers to perform operations comprising:

receiving a first video and a second video, wherein the first video is recorded at a frames per second that is less than a frames per second that the second video is recorded;

determining first time stamps from optical character recognition on pixels in the first video;

determining second time stamps from optical character recognition on pixels in the second video;

determining an earliest frame in each of the videos that time stamps shown in the videos match;

pairing the earliest frames;

determining that a difference between a timestamp in a subsequent frame after the earliest frame in the first video and a time stamp in a subsequent frame after the earliest frame in the second video satisfies a criteria; and pairing the subsequent frame in the first video with a frame after the subsequent frame in the second video.

18. The medium of claim 17, wherein determining that a difference between a timestamp in a subsequent frame after the earliest frame in the first video and a time stamp in a subsequent frame after the earliest frame in the second video satisfies a criteria comprises:

determining that the subsequent frame in the first video has a timestamp that differs from a timestamp of the subsequent frame in the second video by more than a predetermined amount of time.

19. The medium of claim 17, wherein determining that a difference between a timestamp in a subsequent frame after the earliest frame in the first video and a time stamp in a subsequent frame after the earliest frame in the second video satisfies a criteria comprises:

determining a third time stamp for the subsequent frame in the first video based on a frames per second calculated for the first video;

determining a fourth time stamp for the subsequent frame in the second video based on a frames per second calculated for the second video; and determining that a difference in time between the third time stamp and the fourth time stamp satisfies the criteria.

20. The method of claim 1, wherein pairing the subsequent frame in the first video with a frame after the subsequent frame in the second video comprises:

pairing the subsequent frame in the first video with a frame immediately after the subsequent frame in the second video.

\* \* \* \* \*

UNITED STATES PATENT AND TRADEMARK OFFICE
CERTIFICATE OF CORRECTION

PATENT NO. : 10,957,360 B1
APPLICATION NO. : 16/778126
DATED : March 23, 2021
INVENTOR(S) : Robert S. Hastings It is certified that error appears in the above-identified patent and that said Letters Patent is hereby corrected as shown below:

In the Claims

In Claim 2, Column 7, Line 61, before "satisfies" delete "that have a difference that".

In Claim 2, Column 7, Line 62, delete "12071207".

In Claim 4, Column 8, Line 20, delete "that that" and insert -- that --, therefor.

In Claim 12, Column 9, Line 42 (approx.), delete "that that" and insert -- that --, therefor.

Signed and Sealed this
Thirteenth Day of July, 2021

Drew Hirshfeld
*Performing the Functions and Duties of the*
*Under Secretary of Commerce for Intellectual Property and*
*Director of the United States Patent and Trademark Office*